US008176271B2

(12) United States Patent
Srivastava et al.

(10) Patent No.: US 8,176,271 B2
(45) Date of Patent: May 8, 2012

(54) BACKING UP DATA FROM BACKUP TARGET TO BACKUP FACILITY

(75) Inventors: Sandeep Kumar Srivastava, Hyderabad (IN); Chetan A Parulekar, Hyderabad (IN); Erica Sui-Ching Lan, Bellevue, WA (US); Kannan Ramasubramanian, Hyderabad (IN); Suyog Mukund Gadgil, Bellevue, WA (US); Rohan Bhattacharjee, Redmond, WA (US); Vijay Krishnan, Hyderabad (IN); Anatoliy Panasyuk, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 910 days.

(21) Appl. No.: 12/125,904

(22) Filed: May 22, 2008

(65) Prior Publication Data

US 2009/0292888 A1 Nov. 26, 2009

(51) Int. Cl.
*G06F 13/00* (2006.01)
*G06F 13/28* (2006.01)
(52) U.S. Cl. ................. 711/162; 711/E12.103
(58) Field of Classification Search .......... None
See application file for complete search history.

(56) References Cited

U.S. PATENT DOCUMENTS

| | | | |
|---|---|---|---|
| 5,241,670 A | 8/1993 | Eastridge et al. | |
| 5,778,395 A | 7/1998 | Whiting et al. | |
| 6,546,404 B1 | 4/2003 | Davis et al. | |
| 6,704,885 B1 | 3/2004 | Salas-Meza et al. | |
| 6,728,711 B2 | 4/2004 | Richard | |
| 6,728,751 B1 | 4/2004 | Cato et al. | |
| 6,757,698 B2 | 6/2004 | McBride et al. | |
| 7,213,158 B2 | 5/2007 | Bantz et al. | |
| 7,330,997 B1 * | 2/2008 | Odom | 714/6 |
| 7,392,356 B1 * | 6/2008 | Hardman | 711/162 |
| 7,676,510 B1 * | 3/2010 | Karinta | 707/654 |
| 2007/0038884 A1 | 2/2007 | Campbell et al. | |

OTHER PUBLICATIONS

Secure Backup Monster, Software Information, retrieved from <http://www.monsterbackup.co.uk/software_info.html> on Jan. 30, 2008, 4 pages.
Installation of Handy Backup Server, retrieved from <http://www.handybackup.net/help/help_4_1serv_1.shtml> on Jan. 29, 2008, 3 pages.

* cited by examiner

*Primary Examiner* — Reginald Bragdon
*Assistant Examiner* — Eric S Cardwell

(57) ABSTRACT

Aspects of the subject matter described herein relate to backup up data. In aspects, a backup target determines a degree to which a data set included on the backup target is not backed up on a backup facility. The degree can represent more than just that the data set is completely backed up or is not backed up at all. If the degree satisfies a condition, the backup target utilizes information derived from a backup history of one or more attempted or successfully completed backup sessions between the backup target and the backup facility to determine whether to provide a notification regarding backup state. The backup target also may send the degree and other backup information to a backup facility which may use this information in determining a backup scheme to employ with the backup target.

20 Claims, 5 Drawing Sheets

BACKING UP DATA FROM BACKUP TARGET TO BACKUP FACILITY

BACKGROUND

Businesses often have a backup plan in place. In many businesses, a backup of core business data is performed every night. This backup is then taken off site in case a catastrophe happens to the business data at the business site. A backup may be stored for months before the media upon which the backup is stored is reused for another backup or disposed of.

Medium and large businesses may have many employees devoted to ensuring that backups are performed, archived, and available in case of need. Small businesses and individuals, however, may not have the same level of resources to devote to performing and maintaining backups.

In response, some companies have begun offering backup services that back up computer data over the Internet. The backup services rely on connections that may be slow, unreliable, and intermittent. Furthermore, a backup facility may be responsible for backing up data on hundreds, thousands, or more computers. Performing consistent backups under such circumstances is a challenge.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to backup up data. In aspects, a backup target determines a degree to which a data set included on the backup target is not backed up on a backup facility. The degree can represent more than just that the data set is completely backed up or is not backed up at all. If the degree satisfies a condition, the backup target utilizes information derived from a backup history of one or more attempted or successfully completed backup sessions between the backup target and the backup facility to determine whether to provide a notification regarding backup state. The backup target also may send the degree and other backup information to a backup facility which may use this information in determining a backup scheme to employ with the backup target.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
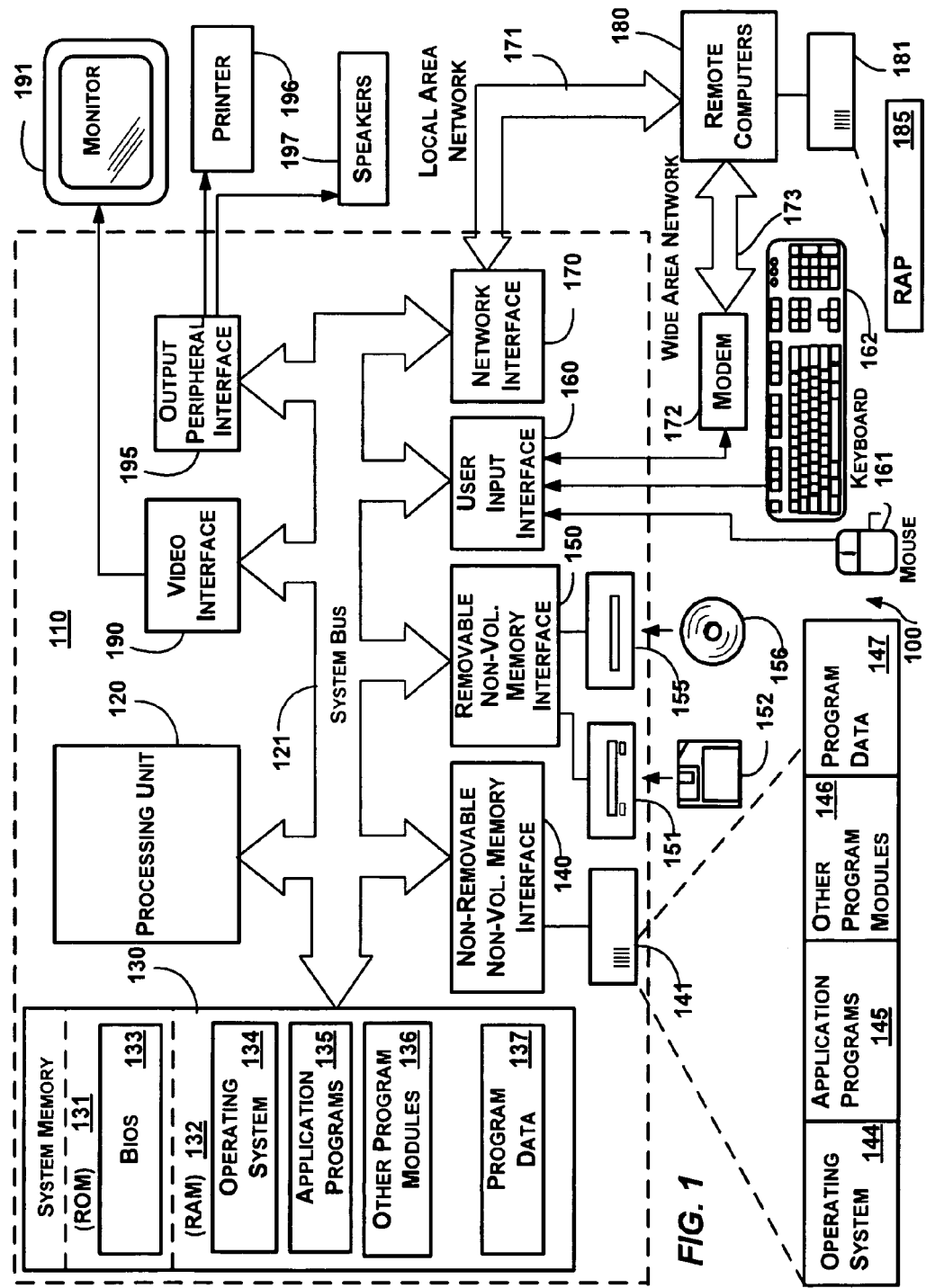
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Backing Up Data

As mentioned previously, backing up data over a potentially unreliable network is challenging. This problem is compounded when the backup targets are not always available (e.g., they may be turned off, disconnected from the network, or otherwise unavailable). This problem is even further compounded when a backup facility has hundreds, thousands, or more backup targets for which it is responsible.

Figure 2:
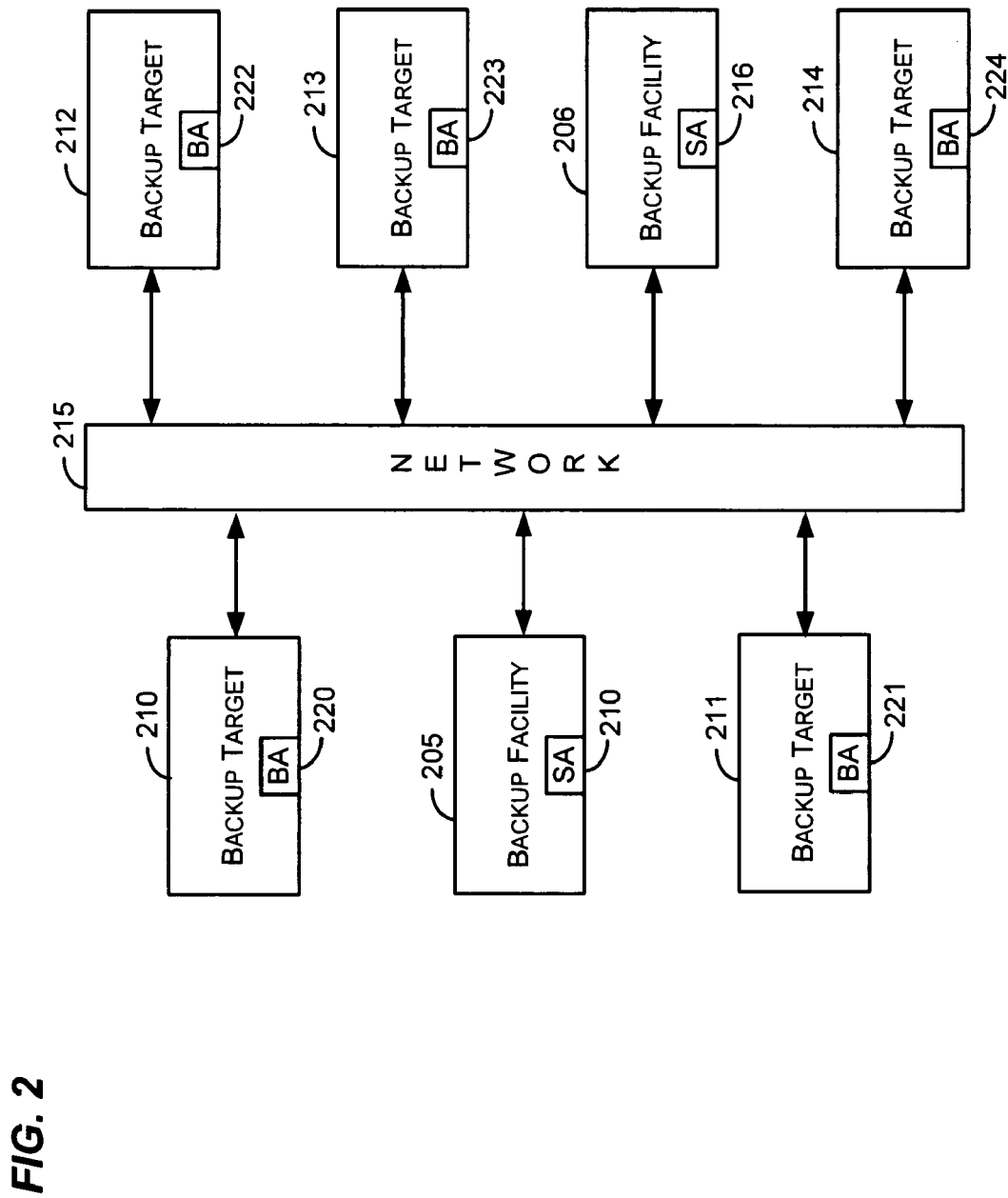
FIG. 2 is a block diagram representing an exemplary environment in which aspects of the subject matter described herein may be implemented.

FIG. 2 is a block diagram representing an exemplary environment in which aspects of the subject matter described herein may be implemented. The environment includes backup facilities 205-206 and backup targets 210-214 and may include other entities (not shown). The various entities may be located relatively close to each other or may be distributed across the world. The various entities may communicate with each other via various networks including intra- and inter-office networks and the network 215.

A backup facility (e.g., the backup facilities 205-206) may comprise one or more backup devices. In one embodiment, a backup facility may comprise one or more data centers that include or are attached to data storage devices which may be used to store computer data. In another embodiment, a backup facility may comprise one or more computers (e.g., computer 110 as described in conjunction with FIG. 1) that include or are attached to data storage devices which may be used to store computer data. In some embodiments, a backup facility may comprise a storage area network (SAN), network attached storage (NAS), or one or more other dedicated storage devices.

A backup facility may replicate data across various nodes at different sites for scalability and redundancy, for example.

A backup target (e.g., the backup targets 210-214) may comprise one or more devices that are capable of handling computer-readable data. One exemplary device that is suitable for this purpose includes the devices mentioned in the various computing system environments and the computer 110 as described in conjunction with FIG. 1. In one example, a backup target may comprise a personal computer in a user's home. In another example, a backup target may comprise one or more computers of a business. In yet another example, a backup target may comprise a hand-held wireless device that utilizes a wireless network. The above list of examples is not intended to be all-inclusive or exhaustive. Indeed, based on the teachings herein, those skilled in the art will recognize many other examples of devices that may implement a backup target that fall within the spirit and scope of the subject matter described herein.

As illustrated, the backup facilities 205-206 include storage agents 210-211, respectively, while the backup targets 210-214 include backup agents 220-224, respectively. These agents will be described in more detail below. Briefly, a backup agent participates with a storage agent in backing up data from a backup target to a backup facility.

In an embodiment, the network 215 may comprise the Internet. In an embodiment, the network 215 may comprise one or more local area networks, wide area networks, direct connections, virtual connections, private networks, virtual private networks, some combination of the above, and the like.

The network 215 (or at least the links from the entities to the network 215) may be a relatively slow and bandwidth limited network, although aspects of the subject matter described herein may also be applied to high speed and high bandwidth networks. Indeed, there is no intention to limit aspects of the subject matter described herein to just low bandwidth or high latency networks. Furthermore, it will be recognized by those skilled in the art that aspects of the subject matter may be employed between any two entities connected by any type of network.

A backup session as described herein refers to a period of time in which a backup facility attempts to copy data from a backup set on a backup target to the backup facility. A backup set may include files and/or data that has changed or that have been created since the last backup session with the backup target. The term data is to be read broadly to include anything that may be stored on a computer storage medium including, for example, computer programs and computer data.

In the environment described above, a variety of backup protocols may be utilized without departing from the spirit or scope of aspects of the subject matter described herein. For example, a backup facility may schedule backup targets for a backup session on a rotating schedule, a backup facility may indicate to a backup target that the backup facility is available for a backup session, a backup target may indicate to a backup facility that the backup target is available for a backup session, a backup target may establish a connection with the backup facility whenever the backup target has a connection to the network 215, a continuous data protection backup protocol may be used where a backup target attempts to backup data shortly after it is created or modified, another backup protocol may be used, and the like.

In one embodiment, because of the number of backup targets it is servicing, its bandwidth, or other factors, a backup facility may only have certain time periods in which it is available to perform a backup session with a particular backup target.

It is possible that a backup facility may not be able to completely backup a backup target during a backup session. For example, when a backup target is first added to a group of backup targets serviced by a backup facility, the backup facility may need to backup a large chunk of data on the backup target as the backup facility may not have seen this data before. This may also result if a user adds a sufficient amount of data to the backup set between backup sessions. For example, a user may return from a vacation and download many high resolution images to the backup target. Given the bandwidth available between the backup target and the backup facility and the length of time allowed to perform the backup, the backup facility may not be able to obtain all of the data in one session.

At the next backup session, the backup facility may attempt to backup files that it was unable to backup during the last session. In addition, a user may have modified existing files that were already backed up and/or may create new files that also need to be backed up to the backup facility. In response, the backup facility may attempt to backup these modified files and new files.

With network availability, availability of the backup target and backup facility, and changes to files on the backup target, it may be possible that that rate at which data is being added and changed on the backup target may exceed the rate at which the data is being backed up to the backup facility. Furthermore, even if a backup facility is able to completely backup a backup target during a backup session, the backup may become out of date soon as or shortly after the backup occurs. This is because files on the backup target may change during or shortly after the backup occurs.

A backup agent of the backup target may determine a degree to which a backup target is backed up and may provide notification to a user as appropriate. For example, the backup agent may provide a "backup gauge" that indicates a degree to which data on the backup target is backed up on a backup facility.

This degree to which the backup target is backed up may be calculated via a variety of ways. For example, in one embodiment, the degree may be calculated by dividing the total bytes currently residing and valid on a backup copy stored on the backup facility by the total number of bytes in the data set that is supposed to be backed up on the backup target. Valid in this sense refers to data that resides on the backup facility that has not changed on the backup target.

As another example, the degree may be calculated by dividing the total number of files residing and valid on a backup copy stored on the backup facility by the total number of files residing in the data set that is supposed to be backed up on the backup target. Valid in this sense refers to files that reside on the backup facility that have not changed on the backup target.

As yet another example, data in the backup set of the backup target that is supposed to be backed up may be classified by level of importance. For example, a file that stores financial data may be classified as high, a file that stores e-mail may be classified as medium, and a file that stores an operating system file or other re-installable or re-creatable file may be classified as low with respect to backups. In this example, the degree may be calculated based on the weighted formula that involves levels for files that have not been backed up to the backup facility.

In addition, the degree may take into account the number of sessions over which files have not been backed up to the backup facility. For example, a single high level file that has not been backed up in several sessions with a backup facility may more heavily influence the degree.

The backup gauge or other component on the backup target may rate files that need to be backed up. This rating may correspond to the length of time since a file was created or modified but not backed up. A file having a longer period of time from being created or modified but not backed up may be rated with a higher rating (e.g., be more urgent to backup) than a file having a shorter period of time from being created or modified but not backed up. Ratings may be used to influence the degree in a weighted manner and/or to determine an order in which to backup the files when a backup session occurs between a backup target and a backup facility.

The backup gauge may also indicate how full a user's online space is. For example, a backup target may be allotted (e.g., assigned a quota of) a specified amount of space on a backup facility. The backup gauge may indicate how much space a backup target is using or has remaining (e.g., how much quota is remaining for the backup target) on the backup facility.

As another example, the backup gauge may include indicators that may affect backups including, for example, low bandwidth (e.g., from a dialup connection), significance of network errors, and the like. In one embodiment, these additional indicators may be used to influence the degree.

To notify a user of backup activity, the backup agent may display a number, color, graph, or other graphical representation that represents the degree. For example, when the backup target is completely backed up or is close to being completely backed up, the backup agent may display a backup gauge that shows backup activity at a safe level. As another example, when backup sessions are not able to keep up with the rate of changes on the backup target for a period of time, the backup agent may display a backup gauge that indicates a percentage of backed up files with an indicator that indicates the rate at which backup sessions are falling behind in backing up files on the backup target.

When backup activity passes one or more thresholds, the user may be presented with a warning notification. In conjunction with providing these notifications, the backup agent may derive backup information from a history of one or more attempted or successfully completed backup sessions. For example, if a high level file has not been backed up during several sessions, a message may be displayed that indicates this problem. As another example, if for several days, the rate of data to backup on the backup target exceeds the rate at which data is being backed, a message may be displayed to indicate this problem. Threshold may be pre-configured and/or user configurable.

When a fatal error occurs, the user may also be presented with a warning notification. For example, if a backup facility is not operational, the user may be informed of this problem. As another example, if a connection to the network 215 is not available, the user may be informed of this problem. Notification for fatal errors may be delayed until there have been a specified number of retries. These retries may span multiple attempted backup sessions.

The backup agent may provide data associated with backup activity to the storage agent of a backup facility. This data may be used by the backup facility to determine a backup priority for the particular backup target. For example, a backup target that is falling behind in performing backups may be given more frequent and/or longer backup sessions with a backup facility. As another example, a backup facility may make available more bandwidth and/or other resources to a backup target that has not been able to backup high level files for a period of time. As yet another example, in a corporate scenario where multiple machines are backed up on a central store with a fast and reliable network, the backup facility may choose one backup target over another backup target in a serial order to avoid poor performance on the hard disk or other resources.

In other embodiments, notifications and backup gauge information that are described herein as being provided to a user may instead be provided to an administrator via an interface separate from the interface associated with the user. For example, an administrator may be assigned to receive notifications and backup gauge information described herein for one or more backup targets.

Although the environment described above includes two backup facilities and five backup targets, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
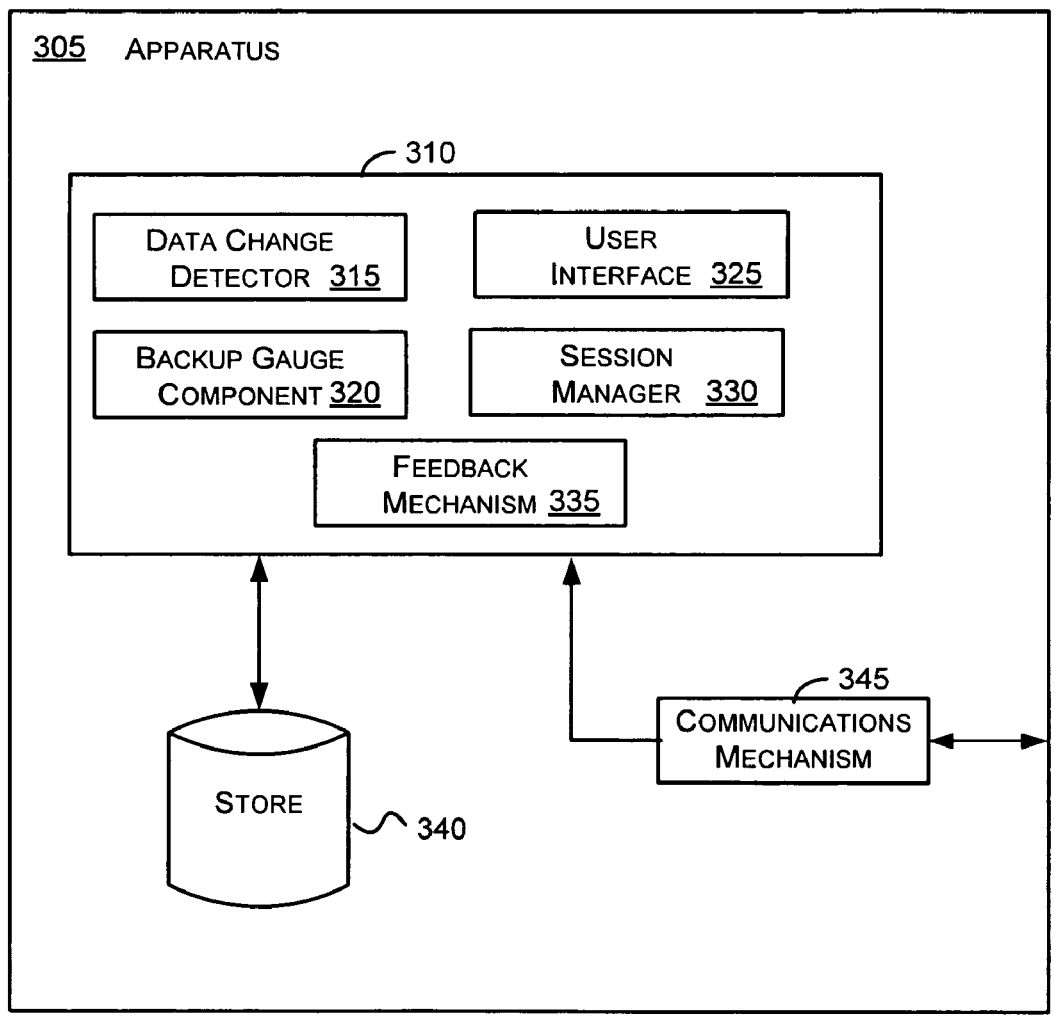
FIG. 3 is a block diagram that represents an exemplary apparatus configured as a backup target in accordance with aspects of the subject matter described herein.

FIG. 3 is a block diagram that represents an exemplary apparatus configured as a backup target in accordance with aspects of the subject matter described herein. The components illustrated in FIG. 3 are exemplary and are not meant to be all-inclusive of components that may be needed or included. In other embodiments, the components or functions described in conjunction with FIG. 3 may be included in other components or placed in subcomponents without departing from the spirit or scope of aspects of the subject matter described herein. In some embodiments, the components or functions described in conjunction with FIG. 3 may be distributed across multiple devices that are accessible to the apparatus 305.

Turning to FIG. 3, the apparatus 305 may include a backup agent 310, a store 340, and a communications mechanism 345. The backup agent 310 may include a data change detector 315, a backup gauge component 320, a user interface 325, a session manager 330, and a feedback mechanism. The backup agent 310 corresponds to the backup agents 220-224 of FIG. 2.

The communications mechanism 345 allows the apparatus 305 to communicate with other entities as shown in FIG. 2. The communications mechanism 345 may be a network interface or adapter 170, modem 172, or any other mechanism for establishing communications as described in conjunction with FIG. 1.

The store 340 is any storage media capable of storing data including data sets that need to be backed up on a backup facility. The store 340 may comprise a file system, database, volatile memory such as RAM, other storage, some combination of the above, and the like and may be distributed across multiple devices. The store 340 may be external or internal to the apparatus 305.

The data change detector 315 is a component that determines data in the store 340 that is backed up on a backup facility and data in the store 340 that is not backed up on a backup facility. Note that the store 340 may include a data set that is to be backed up on a backup facility and other data that is not to be backed up on a backup facility. For example, all data within a particular directory and its descendant directories may be supposed to backed up on a backup facility while data outside of the directory and its descendants is not supposed to be backed up on backup facility.

The backup gauge component 320 may be operable to determine a degree to which a data set is backed up on a backup facility based at least in part on performing calculations regarding portions of the data set that are currently backed up and portions that are not currently backed up. One such calculation may be to divide the number of bytes in the portion that is currently backed up by a sum that includes the number of bytes currently and not currently backed up on a backup facility. A similar calculation may be performed with respect to files. Calculations may be weighted as described previously to account for levels, ratings, or other information associated with files.

The backup gauge component 320 may be further operable to derive backup information from a history of one or more attempted or successfully completed backup sessions with the backup facility. This history information may indicate whether the backup facility is falling behind in backing up the data set as described previously.

The user interface 325 may be used to provide notifications to a user regarding the state of backups. Some exemplary notification that the user interface 325 may provide have been described previously. In addition, the user interface 325 may be used to provide information to the user that is useful in resolving an undesirable backup state.

The session manager 330 may manage backup sessions in which data is transferred from a backup target to a backup facility. The session manager 330 may inform a backup facility that the backup target is available for a backup session, may receive a request from a backup facility to engage in a backup session, may throttle the bandwidth that is consumed during the backup session so that user interaction with the network is not degraded, may suspend or stop a backup session, may perform other session related activities, and the like.

The feedback mechanism 335 may provide backup information to a backup facility for use by the backup facility at least in prioritizing backup activities with respect to the backup target. This backup information may include the degree to which a backup target is currently backed up and may also include history regarding backup sessions, for example.

Figure 4:
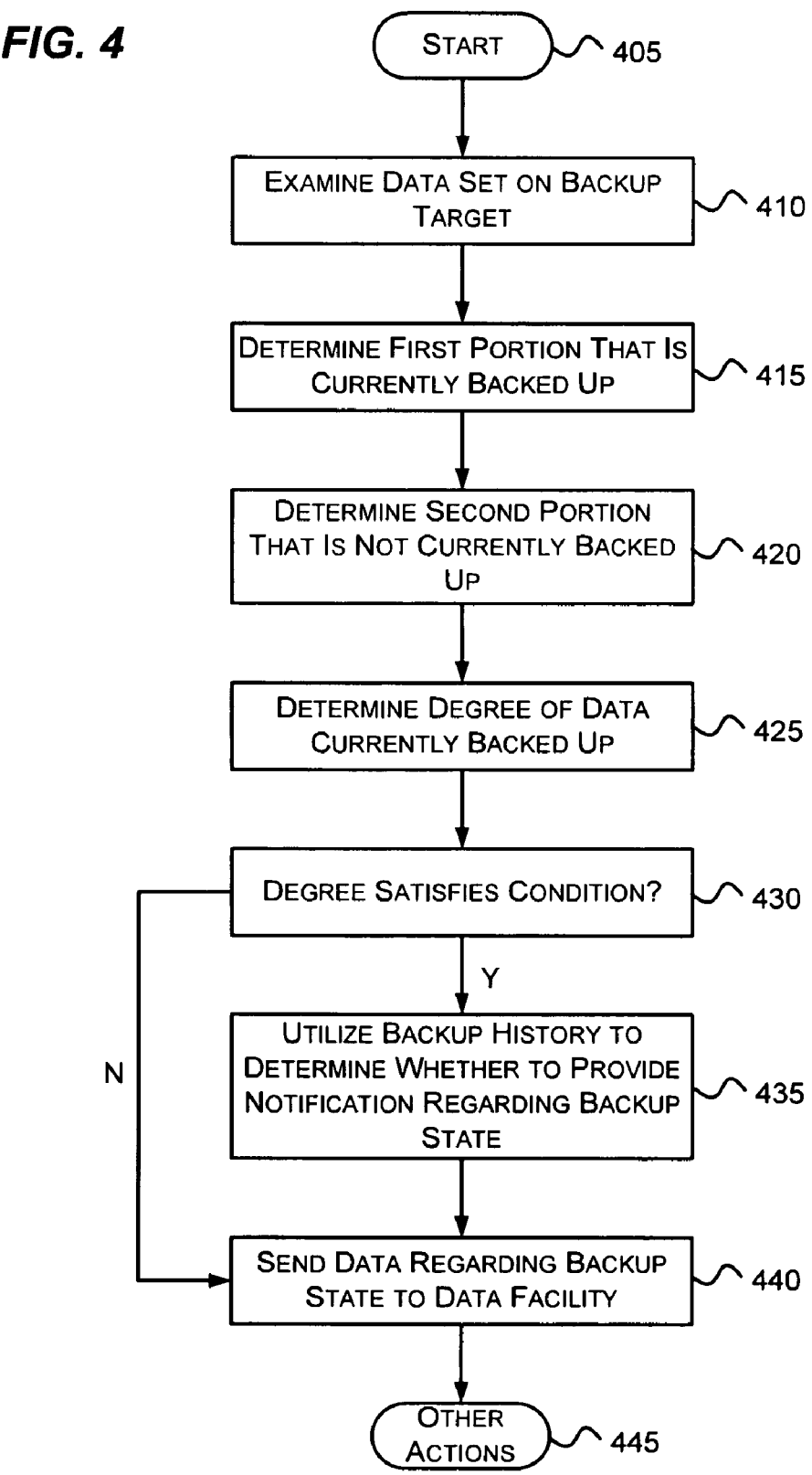
FIG. 4 is a flow diagram that generally represents actions that may occur on a backup target in accordance with aspects of the subject matter described herein.
Figure 5:
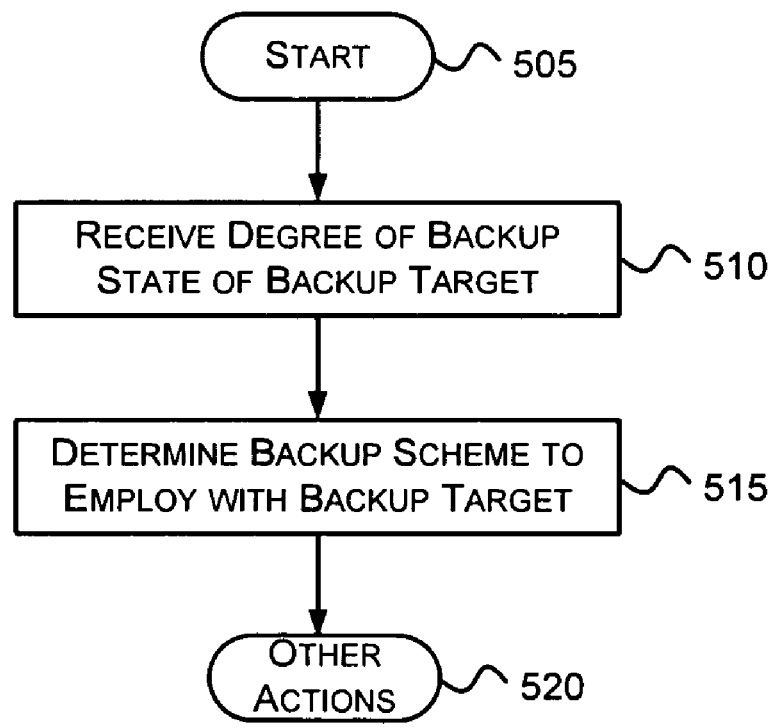
FIG. 5 is a flow diagram that generally represents actions that may occur on a backup facility in accordance with aspects of the subject matter described herein.

FIGS. 4 and 5 are flow diagrams that generally represent actions that may occur in conjunction with backing up data from backup target to backup facility in accordance with aspects of the subject matter described herein. For simplicity of explanation, the methodology described in conjunction with FIGS. 4 and 5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a flow diagram that generally represents actions that may occur on a backup target in accordance with aspects of the subject matter described herein. At block 405, the actions begin. At block 410, a data set on a backup target is examined. For example, referring to FIG. 3, a data change detector 315 examines a data set stored on the store 340 to determine how much of the data set is currently backed up on a backup facility and how much of the data set is not currently backed up on a backup facility. This examining may involve the actions described below in conjunction with blocks 415 and 420.

At block 415, a first portion of the data set that is currently backed up on the backup facility is determined. For example, referring to FIG. 3, the data change detector 315 determines a first portion of the data set that has not been changed or added since a last backup session and that has been marked as backed up onto a backup facility.

At block 420, a second portion of the data set that is not currently backed up on the backup facility is determined. For example, referring to FIG. 3, the data change detector 315 determines a second portion of the data set that includes data that has never been backed up onto the backup facility and data has been changed or added since a last backup session.

At block 425, a degree to which the data set is backed up on the backup facility is determined based at least in part on the first and second portions. As mentioned previously, the degree is capable of indicating more than just that the data set is completely backed up or that the data set is not backed up at all. For example, referring to FIG. 3, the backup gauge component divides a number of bytes in the first portion by a number of bytes in a sum that includes the first and second portions of the data set and arrives at a degree to which the data set is backed up on a backup facility. Other calculations of degree as described previously may also be used.

At block 430, a determination is made as to whether the degree satisfies a pre-configured condition. If so, the actions continue at block 435; otherwise, the actions continue at block 440. For example, referring to FIG. 3, the backup gauge component 320 may determine whether the degree calculated above is less than or equal to a settable threshold.

At block 435, backup information derived from a history of one or more attempted or successfully completed backup sessions between the backup target and the backup facility is used to determine whether to provide a notification regarding backup state. For example, referring to FIG. 3, the backup gauge component 320 may use history information to determine whether to provide a notification to a user regarding the backup state.

At block 440, data regarding the backup state of the backup target is sent to the data facility. This may be used by the backup facility at least in prioritizing backup activities with respect to the backup target. For example, referring to FIG. 3, the feedback mechanism 335 may send a message to a backup facility that includes the degree and other backup state of the backup target.

At block 445, other actions, if any, may be performed.

FIG. 5 is a flow diagram that generally represents actions that may occur on a backup facility in accordance with aspects of the subject matter described herein. At block 505, the actions begin.

At block 510, a degree of a backup state of a backup target is received at the backup facility. For example, referring to FIG. 2, the backup facility 205 receives a degree of backup state from the backup target 210.

At block 515, based on the degree, a backup scheme to employ with the backup target is determined. For example, referring to FIG. 2, the backup facility 205 determines a backup scheme to employ with the backup target 210. The backup scheme may include, for example, determining a schedule characteristic that gives priority to the backup target over other backup targets that are backed up to a greater degree than the degree of the backup target. As another example, the backup scheme may include a bandwidth characteristic to allot to one or more subsequent backup sessions with the backup target. At yet another example, the backup scheme may include a length of time to allow for each of one or more subsequent backup sessions.

The above examples are not intended to be exhaustive or all-inclusive. Indeed, those skilled in the art may recognize many other backup schemes that may be determined by a backup facility based on the degree without departing from the spirit or scope of aspects of the subject matter described herein.

At block 520, other actions, if any, may be performed.

As can be seen from the foregoing detailed description, aspects have been described related to backing up data. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
    examining a data set on a backup target, the data set to be backed up on a backup facility, wherein examining a data set on the backup target comprises:
        determining a first portion of the data set that is currently backed up on the backup facility, and
        determining a second portion of the data set that is not currently backed up on the backup facility;
    determining a degree to which the data set is backed up on the backup facility based at least in part on the first and second portions, the degree capable of indicating more than just that the data set is completely backed up or that the data set is not backed up at all, the determining comprising dividing a number of files included in the first portion by a number of files included in a sum of the first and second portions; and
    if the degree satisfies a pre-configured condition, utilizing backup information derived from a history of one or more attempted or successfully completed backup sessions between the backup target and the backup facility to determine whether to provide a notification regarding backup state, the backup information indicating whether a second rate of updates from the data set on the backup target to a backed up data set on the backup facility is less than a first rate of changes to the data set on the backup target.

2. The method of claim 1, wherein determining a degree to which the data set on the backup target is backed up on the backup facility further comprises dividing a number of bytes in the first portion by a sum of bytes included in the first and second portions.

3. The method of claim 1, wherein determining a degree to which data on the backup target is backed up on the backup facility is further based on a level associated with data in the second portion, the level indicating a classification associated with the data, the level corresponding to one of high, medium, and low.

4. The method of claim 3, wherein determining a degree to which data on the backup target is backed up on the backup facility comprises utilizing a formula that assigns different weights to each level of data.

5. The method of claim 1, wherein utilizing backup information derived from a history of one or more attempted or successfully completed backup sessions between the backup target and the backup facility to determine whether to provide a notification regarding backup state comprises determining whether a fatal error occurred during the history.

6. The method of claim 1, further comprising sending data corresponding to the degree to the backup facility for use by the backup facility at least in prioritizing backup activities with respect to the backup target.

7. The method of claim 1, wherein the degree satisfies a pre-configured condition if the degree is less than or equal to a selectable threshold.

8. The method of claim 1, wherein determining a degree to which the data set is backed up on the backup facility further comprises taking into account a number of sessions over which one or more files are not backed up to the backup facility.

9. A method implemented at least in part by a computer, the method comprising:
    examining a data set on a backup target, the data set to be backed up on a backup facility, the examining comprising:
        determining a first portion of the data set that is currently backed up on the backup facility, and
        determining a second portion of the data set that is not currently backed up on the backup facility;
    determining a degree to which the data set is backed up on the backup facility based at least in part on the first and second portions, the degree capable of indicating more than just that the data set is completely backed up or that the data set is not backed up at all; and
    if the degree satisfies a pre-configured condition, performing the following:
        deriving backup information from a history of one or more attempted or successfully completed backup sessions between the backup target and the backup facility, the deriving comprising:
            determining a first rate of changes to the data set on the backup target,
            determining a second rate of updates from the data set on the backup target to a backed up data set on the backup facility, and
            determining whether the second rate is less than the first rate; and
        utilizing the backup information to determine whether to provide a notification regarding backup state.

10. The method of claim 9, further comprising providing the notification if the second rate is less than the first rate, the notification indicating that the backup facility is falling behind in backing up the data set.

11. The method of claim 9, wherein determining the first rate of changes to the data set comprises determining a first number of bytes changed or added to the data set and dividing the first number by a second number corresponding to a number of backup sessions over which the first number of bytes were changed or added.

12. A computer storage medium having computer-executable instructions, which when executed perform actions, comprising:
   at a backup facility that is responsible for backing up data sets from a plurality of backup targets, receiving a message that indicates a degree to which a data set included on a backup target is backed up, the degree capable of indicating more than just that the data set is completely backed up or that the data set is not backed up at all, the degree being based at least in part on a number of files included in a first portion of the data set that is currently backed up on the backup facility divided by a number of files included in a sum of the first portion and a second portion of the data set that is not currently backed up on the backup facility; and
   based at least in part on the degree, determining a backup scheme to employ with the backup target, the backup scheme indicating characteristics of one or more subsequent backup sessions with the backup target, a backup session being a period of time in which the backup facility attempts to backup non-backed up data in the data set, the backup scheme being based on whether a second rate of updates from the data set on the backup target to a backed up data set on the backup facility is less than a first rate of changes to the data set on the backup target.

13. The computer storage medium of claim 12, wherein the degree is computed utilizing a formula that assigns different weights to different levels associated with different portions of the data set, each level corresponding to one of high, medium, and low.

14. The computer storage medium of claim 12, wherein determining a backup scheme to employ with the backup target comprises determining a schedule characteristic of the one or more subsequent backup sessions with the backup target, the schedule characteristic giving priority to the backup target over other backup targets that are backed up to a greater degree than the degree of the backup target.

15. The computer storage medium of claim 12, wherein determining a backup scheme to employ with the backup target comprises determining a bandwidth characteristic to allot to the one or more subsequent backup sessions.

16. The computer storage medium of claim 12, wherein determining a backup scheme to employ with the backup target comprises determining a length of time allowed for each of the one or more subsequent backup sessions.

17. A computer storage medium having computer-executable instructions, which when executed perform actions, comprising:
   at a backup facility that is responsible for backing up data sets from a plurality of backup targets, receiving a message that indicates a degree to which a data set included on a backup target is backed up, the degree capable of indicating more than just that the data set is completely backed up or that the data set is not backed up at all, the message including information derived from a history of one or more attempted or successfully completed backup sessions between the backup target and the backup facility, the information being derived at least in part by actions, comprising:
      determining a first rate of changes to the data set on the backup target,
      determining a second rate of updates from the data set on the backup target to a backed up data set on the backup facility, and
      determining whether the second rate is less than the first rate; and
   based at least in part on the degree, determining a backup scheme to employ with the backup target, the backup scheme indicating characteristics of one or more subsequent backup sessions with the backup target, a backup session being a period of time in which the backup facility attempts to backup non-backed up data in the data set.

18. In a computing environment, an apparatus, comprising:
   a data change detector operable to detect a first portion of a data set that is currently backed up on a backup facility and a second portion of the data set that is not currently backed up on the backup facility;
   a session manager operable to engage in backup sessions with the backup facility and to transmit data that has not been backed up during the backup sessions;
   a backup gauge component operable to determine a degree to which the data set is backed up on the backup facility based at least in part on the first and second portions and to generate a notification if the degree satisfies a condition, the backup gauge component being further operable to derive backup information from a history of one or more attempted or successfully completed backup sessions with the backup facility, the backup information indicating whether the backup facility is falling behind in backing up the data set based on whether a second rate of updates from the data set on the backup target to a backed up data set on the backup facility is less than a first rate of changes to the data set on the backup target; and
   a user interface operable to display a user interface element corresponding to the notification.

19. The apparatus of claim 18, further comprising a feedback component operable to provide information including the degree to the backup facility for use by the backup facility at least in prioritizing backup activities.

20. The apparatus of claim 18, wherein the backup gauge component is operable to determine the first rate of changes, determine the second rate of updates, and determine whether the second rate is less than the first rate.

* * * * *